United States Patent

Chadwick

[15] 3,701,938
[45] Oct. 31, 1972

[54] MINIMUM VALVE VOLTAGE METHOD AND CONTROL APPARATUS FOR HVDC POWER CONVERTERS

[72] Inventor: Philip Chadwick, Media Pike, Pa.
[73] Assignee: General Electric Company, Philadelphia, Pa.
[22] Filed: Aug. 9, 1971
[21] Appl. No.: 170,081

[52] U.S. Cl. .......................321/11, 321/5, 321/12, 321/27 R
[51] Int. Cl. .........................H02m 7/12, H02m 1/18
[58] Field of Search ..................321/5, 11, 12, 27 R

[56] References Cited

UNITED STATES PATENTS

| | | | |
|---|---|---|---|
| 3,350,568 | 10/1967 | Peaslee | 307/236 |
| 3,412,262 | 11/1968 | Grees et al. | 307/225 B |
| 3,458,795 | 7/1969 | Ainsworth | 321/5 |
| 3,466,525 | 9/1969 | Ainsworth | 321/5 |
| 3,573,603 | 4/1971 | Andersson | 321/12 |

Primary Examiner—William M. Shoop, Jr.
Attorney—J. Wesley Haubner, Albert S. Richardson, Jr., Frank L. Neuhauser, Oscar B. Waddell and Joseph B. Forman

[57] ABSTRACT

A minimum valve voltage firing control method and circuit for HVDC thyristor power converter circuit operated in the rectifying mode. The valve of the commutating voltage across the respective thyristor valves is sampled and the minimum sampled value during each valve firing stored on a capacitor through the medium of suitable valve voltage sampling and gating circuits. The stored valve voltage samples are compared to a minimum valve voltage reference value and an error signal derived under conditions where an insufficient valve voltage is indicated. The error signal is employed to increase the minimum angle of delay of firing $\alpha$ to a safe value adequate to assure a sufficient valve firing voltage.

18 Claims, 7 Drawing Figures

MINIMUM VALVE VOLTAGE METHOD AND CONTROL APPARATUS FOR HVDC POWER CONVERTERS

BACKGROUND OF INVENTION

1. Field Of Invention

This invention relates to a novel minimum valve voltage control method and circuit for power converters.

More specifically, the invention relates to a method of operation and control circuit for HVDC power converters which assures an adequate voltage across the thyristor valves of the power converter during successive valve firings and prevents repeated gating of the valves with an insufficient valve voltage.

2. Prior Art Problem

HVDC thyristor power converters operating in the rectifying mode require that a minimum voltage exist across the respective thyristor valves at the time of firing of the valves. This is particularly true of high voltage, large current rated HVDC thyristor valves of the solidstate semiconductor type that are comprised of a number of semiconductor cells interconnected in parallel for large current and having a number of levels of such parallel connected cells interconnected in series for high voltage. With such thyristor valves, gating of the valves with insufficient anode-to-cathode voltage can lead to only a low number of parallel current paths being established at a voltage level at the instant of firing thereby requiring this low number of current paths to sustain all of the current. While this situation can be tolerated only once over many operating hours, repeated gating of the valve with insufficient firing voltage and only a low number of current paths established in each level, can lead to permanent damage of the valve.

When operating thyristor power inverters in the rectifying mode (i.e. converting alternating current power to direct current power) it is desirable and often necessary to fire the thyristor valves of the converter with a minimum angle of delay $\alpha$ in order to satisfy power requirements of the systems being supplied. For this purpose and in order to assure somewhat adequate valve firing voltage, a number of thyristor power converter control circuits have been developed in the past and are now well known which impose an $\alpha_{MIN}$ limit control on the firing of the thyristors. This $\alpha_{MIN}$ limit control limits the angle of delay $\alpha$ of firing of the thyristor valves to some predetermined minimum value (measured with respect to the supply alternating current waveform) within which firing pulses are inhibited and cannot be supplied to the gates of the thyristor valves. Under normal operating conditions with the AC supply undistorted, the $\alpha_{MIN}$ limit is set as small as possible and functions to assure an adequate minimum valve firing voltage for the thyristor valves. However, upon a disturbance occurring on the AC supply system such as the appearance of undesired harmonics, the $\alpha_{MIN}$ limit may be set too low to assure sufficient firing voltage across the thyristors in the presence of the AC system disturbance. Under such circumstances, it would be desirable for the $\alpha_{MIN}$ limit to be immediately driven out to some increased angle of delay that would be sufficient to assure adequate firing voltage across the thyristor valve even in the presence of the AC system disturbance. In addition, for operational reasons, it is not desirable that the $\alpha_{MIN}$ limit be held out at some fixed increased, minimum angle of delay indefinitely, but should allow the $\alpha_{MIN}$ limit to relax back to the original minimum limit setting after some predetermined period of time gauged to allow adequate time for the AC system disturbance to pass, and for the AC system to return to normal operating conditions. To meet this need, the present invention was devised.

SUMMARY OF INVENTION

It is therefore a primary object of the invention to provide a novel minimum valve voltage control method and circuit for HVDC thyristor power converters for preventing repetitive gating of the thyristor valves of the converter under conditions where there is insufficient anode-to-cathode voltage across the valve whereby the multi-parallel/series path HVDC solidstate thyristor valves are protected from repetitive firings under conditions where not all parallel paths in a given voltage level are turned on.

Another object of the invention is the provision of such a minimum valve voltage control method and circuit which also assures that the valve firing spacings remain reasonably equal during AC system disturbances due to the fact that the control affects the firing angles of all of the thyristor valves substantially equally.

In practicing the invention a minimum valve voltage firing control method and circuit is provided for controlling the firing angle of delay of the thyristor valves of a power converter operated in the rectifying mode. The method and control senses the minimum value of the commutating voltage associated with each thyristor valve in the converter during a portion of its conduction interval and stores this sensed minimum value of the respective thyristor commutating voltages. The stored value of the respective minimum thyristor commutating voltages is compared to a preset minimum reference value and an output error signal is derived which is indicative of any difference. Output error signals indicative of insufficient valve voltages are then employed to control the firing angle of delay $\alpha$ of the thyristor valves in a manner such that the firing angle of delay $\alpha$ of the thyristors is increased to a safe value sufficient to assure adequate valve firing voltage across the thyristor valves even in the presence of AC system disturbances. Thereafter, the firing angle of delay of the thyristor automatically is returned back to a normal setting generally determined by other control parameters of the power converter over a relatively long time constant period measured with respect to the period and repetition rate of the thyristor valve firings. The firing angle of delay $\alpha$ of all the thyristor valves of the power converter are controlled simultaneously so as a result the valve firing spacings are maintained substantially equal. Additionally, the output error signal indicative of an insufficient valve firing voltage is amplified severalfold in advance of applying it to increase the firing angle of delay $\alpha$ so that sudden and rapid increases in the firing angle of delay $\alpha$ can be achieved immediately in response to AC system transient disturbances that otherwise might result in an insufficient valve voltage across the thyristor valves at the time of firing.

BRIEF DESCRIPTION OF DRAWINGS

Other objects, features and many of the attendant advantages of this invention will be appreciated more readily as the same becomes better understood by reference to the following detailed description, when considered in connection with the accompanying drawings wherein like parts in each of the several figures are identified by the same reference character, and wherein.

DETAILED DESCRIPTION OF PREFERRED EMBODIMENTS

Figure 1:
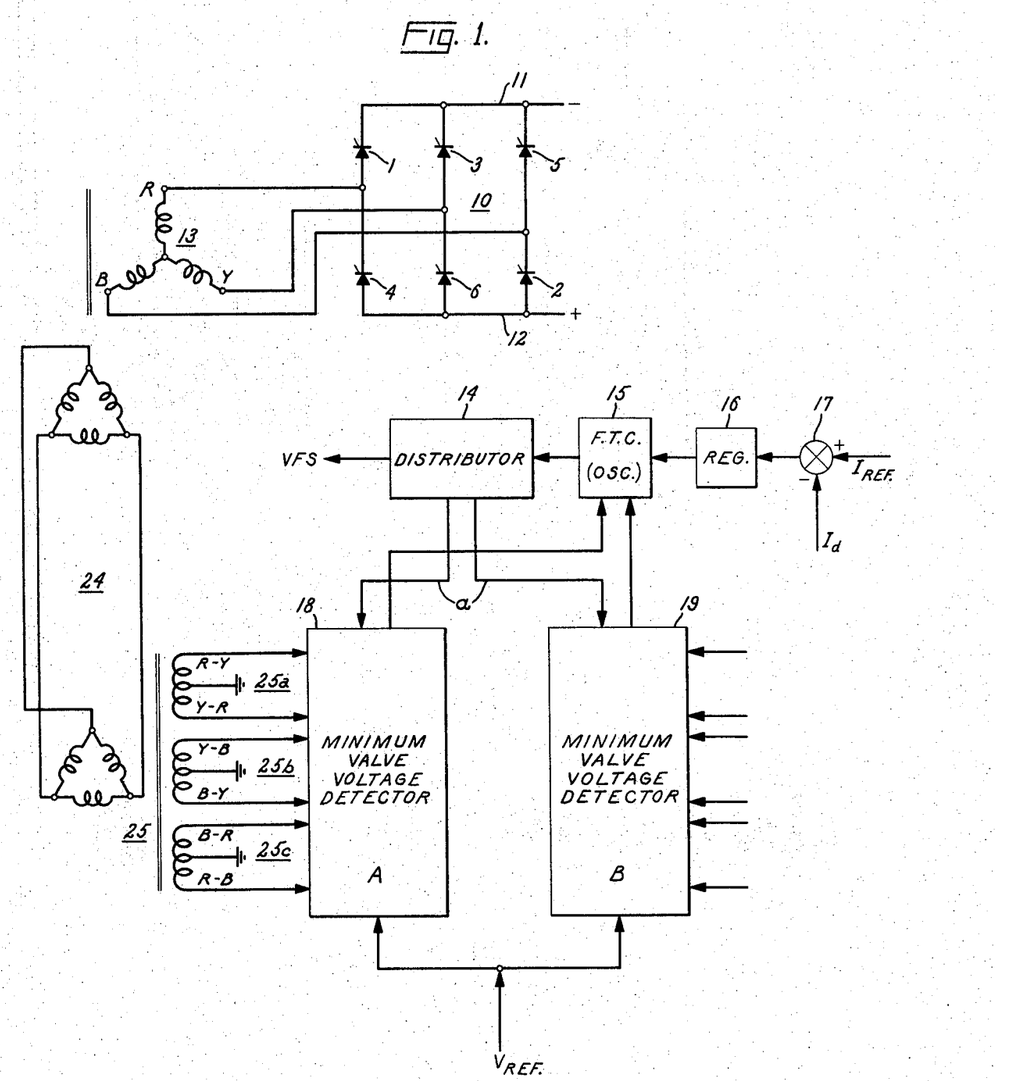
FIG. 1 of the drawings is a functional block diagram of a novel minimum valve voltage firing control circuit constructed in accordance with the invention.

FIG. 1 is a functional block diagram of a minimum valve voltage control constructed in accordance with the invention. In FIG. 1, a HVDC thyristor bridge power converter is shown at 10 and is comprised by at least six HVDC thyristor valves 1–6 connected in pairs with each valve being rendered conductive in the sequence indicated by its reference numeral. Thy thyristor valves 1–6 are connected in pairs between two direct current conductors 11 and 12 and a set of three phase alternating current conductors connected to phase windings R, Y and B, respectively, in a known manner. The phase windings R, Y and B comprise the three phase windings of a supply transformer 13 for supplying alternating current to the bridge thyristor 1–6 under conditions where the converter is operating in the rectifying mode. The thyristor valves 1, 3 and 5, respectively, of each valve pair have their cathodes connected in common to the DC conductor 11 and the thyristor valves 2, 4 and 6 have their anodes connected in common to the DC conductor 12. It is intended that the present invention be employed with HVDC power converters of the type capable of operating in the rectifying mode to convert alternating current to direct current power and also capable of operating in the inverting mode for converting direct current power to alternating current power. However, the invention is in no way restricted to use with such HVDC power converters and may be employed in any conventional, multiphase London, converter circuit wherein maintenance of a minimum valve voltage across the thyristor valves of the converter presents a problem. For a more detailed description of HVDC power converters such as 10, reference is made to the textbooks entitled "High Voltage Direct Current Power Transmission" by C. Adamson and N.G. Hingorani (Garroway Ltd., London 1960) and "Principles of Inverter Circuit" by B.D. Bedford and R. G. Hoft (John Wiley and Sons, Inc., New York, 1964).

The HVDC thyristor valves 1–6 preferably comprise solid state semiconductor silicon control rectifier devices which are now well known in the art but also could comprise thyritrons, ignitrons, mercury arc rectifiers or other similar, known grid controlled conducting devices having thyristor-like operating characteristics similar to the silicon controlled rectifier. While the HVDC thyristor valves 1–6 are referred to as a thyristor valve (or device), it should be noted that because of the intended high voltage, large current capability, these valves in fact comprise a multiplicity of parallel and/or series connected silicon controlled rectifier cells, interconnected in parallel for large current and in series for large voltage to form the desired individual HVDC valves depicted as 1–6 in FIG. 1. Such parallel and/or series interconnection of individual silicon control rectifier cells to form grid controlled conducting valves of a desired high voltage and high current conducting capability, is well known in the art and will not be described in detail. It should be further noted that while the HVDC power converter shown in FIG. 1 comprises a six pulse bridge circuit (due to the use of the six thyristor valves 1–6), the invention also can be used in conjunction with 12 pulse bridge circuits or any other known multiphase power converter arrangement. For example, a twelve pulse bridge power converter would comprise two six pulse bridges similar to 10 which are supplied with suitably phased alternating current potentials from star and delta connected supply transformer windings appropriately interconnected to provide a phase displacement of 30° between the respective AC terminals of the two six pulse bridges, and would have the direct current terminals of the bridges interconnected in series in a manner well known in the art.

Firing pulses are applied to the control gates of the respective thyristor valves 1–6 to cause them to turn on and conduct current in the sequence indicated by their reference numeral. These firing pulses are supplied from a valve firing system (not shown) connected to apply appropriately phased firing pulses to the control gates of the thyristors. The valve firing system in turn is under the control of a distributor 14 and firing time computer 15 of known construction. The firing time computer (FTC) comprises a variable frequency oscillator for supplying firing pulses to the distributor 14 at a varying repetition rate determined by the magnitude and polarity of an input regulating control signal supplied to the FTC 15 from a regulator 16. Regulator 16 in turn obtains its controlling input from a summing junction 17 to which input controlling signals representative of the actual load current $I_d$ and load current reference $I_{REF}$, are supplied for normally controlling (regulating) the operation of the power converter 10. The regulator 16, FTC 15 and distributor 14 all may comprise conventional known devices, but preferably are of the type described in copending U.S. patent application assigned to the General Electric Company (11LAO-3210-Pollard) pending concurrently herewith.

The only requirements of the regulator 16, FTC 15 and distributor 14 is that they be capable of accepting a varying magnitude, direct current control signal of either positive or negative polarity and representative of the error between the actual load current and the reference load current, and thereafter function in response to such control signal to appropriately advance or retard the firing angles of the individual thyristor valves 1–6 in the power converter so as to reduce the magnitude of the error towards zero in a normal regulating manner. In addition to the above characteristics, it is preferred that the FTC 15 be of the type including an $\alpha_{MIN}$ limit control which automatically inhibits the supply of a firing pulse to the distributor 14 for a minimum period of delay $\alpha_{MIN}$ to allow a minimum anode to cathode valve voltage to build up across the thyristor valves 1–6 as the supply alternating current voltage passes through zero (wt = 0) in the positive direction with the minimum angle of delay $\alpha_{MIN}$ being measured with respect to the phase of supply alternating current.

Figure 2:
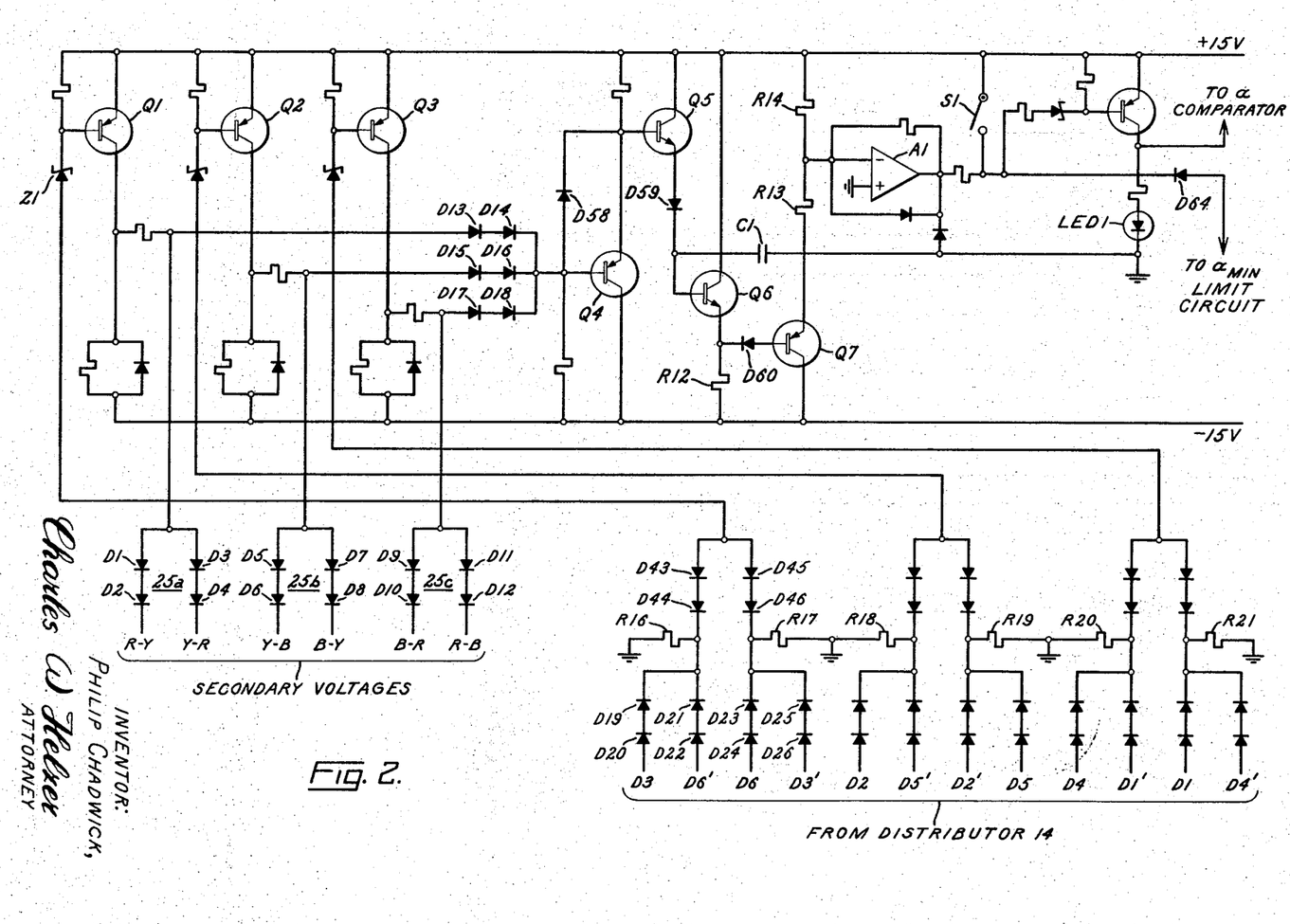
FIG. 2 is a detailed circuit diagram of a minimum valve voltage detection circuit suitable for use with the overall control system shown in FIG. 1.

In addition to the regulating control signal supplied from regulator 16, FTC 15 also receives input controlling signals from a pair of minimum valve voltage detectors 18 and 19 which are applied to the $\alpha_{MIN}$ control circuitry of the FTC. The purpose of these controls will be understood more fully hereinafter following a reading of the complete specification. The minimum valve voltage detector 19 is intended for use with the second or prime bridge arrangement (similar to that shown at 10) of a twelve pulse bridge power converter. The construction and operation of the minimum valve voltage detector 19 together with its connection to the second or prime power bridge (not shown) is similar to that of the power bridge 10, and hence will not be separately described. The details of construction and operation of the minimum valve voltage detector 18 are shown in FIG. 2 of the drawings, and will be described more fully hereinafter.

Briefly, however, in operation the minimum valve voltage detector circuit 18 samples the value of the commutating voltage associated with each of the thyristor valves 1–6 of the power converters at the time of conduction of the valves. For this purpose the various phase to phase commutating voltages appearing across the valve are sampled through the intermediary of a tertiary transformer 24 coupled to the supply transformer 13 and connected to the primary winding of an auxiliary transformer 25. The auxiliary transformer 25 has a plurality of secondary windings 25a, 25b and 25c which are center tapped and provide the various phase to phase voltages R-Y, Y-R, Y-B, B-Y, B-R and R-B as inputs to the minimum valve voltage detector 18 for a purpose that will be understood better hereinafter. In addition to the sample thyristor valve voltages, the minimum valve voltage detectors A and B have supplied thereto a reference voltage $V_{REF}$ representative of a predetermined minimum valve voltage which the anode to cathode voltages appearing across the respective thyristor valves should exceed in advance of having firing pulses supplied to the valves.

Figure 3:
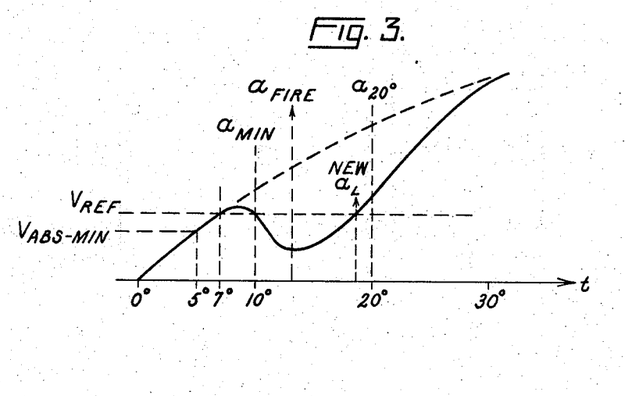
FIG. 3 is a voltage waveform characteristic curve illustrating the need for and manner of operation of the new and improved minimum valve voltage control.

The purpose and need for the present invention can be better appreciated from a consideration of FIG. 3 of the drawings which illustrates the leading edge portion (approximately 0°–30°) of the waveform of a theoretical halfwave commutating voltage appearing across one of the thyristor valves 1–6. An idealized waveform representing the commutating voltage that appears under normal operating conditions, is illustrated in dotted outline form, while the solid line waveform is for a harmonic distorted condition such as might be produced by an AC disturbance appearing in the alternating current supply. Under normal operating conditions, a firing pulse would be supplied to the thyristor valve at the $\alpha_{FIRE}$ point (indicated in FIG. 3) measured with respect to the phase of the supply alternating current. It will be observed that for the normal dotted line waveform, the $\alpha_{MIN}$ limit setting at 10° is quite adequate to assure that a sufficient anode to cathode voltage has built up across the valve prior to the application of the firing pulse. The voltage level indicated at $V_{ABS-MIN}$ is the actual, absolute minimum valve firing voltage set by manufacturing specifications required to exist across the anode to cathode of the thyristor valve in order to assure proper firing of all parallel paths at all voltage levels of the HVDC thyristor valves. It can be seen from FIG. 3 that, if due to harmonic distortion the voltage across the valve subsequently drops or dips in the manner illustrated in FIG. 3, an inadequate valve firing voltage which is below the $V_{ABS-MIN}$ value, appears across the valve. As a consequence, repeated gating of the valve under such conditions could lead to failure as mentioned above.

In order to overcome the above briefly described difficulty, the present minimum valve voltage control circuit samples the voltage appearing across each thyristor valve successively at the instant of firing (for example at $\alpha_{FIRE}$ shown in FIG. 3) and temporarily stores this valve voltage sample on a capacitor. The stored valve voltage sample then is compared with a reference minimum voltage shown at $V_{REF}$ in FIG. 3, which is established to be at least 50 percent greater than the actual $V_{ABS-MIN}$ for the thyristor valve. Should any valve voltage sample be less than the reference voltage value $V_{REF}$ at the instant of sampling, an output error signal is derived which increases the $\alpha_{MIN}$ limit setting outwardly in the direction of the arrow towards an increased value (for example 30°°) so as to insure subsequent safe valve firings with adequate valve voltage. As stated earlier, the gating of a thyristor valve with insufficient voltage across it only once over many operating hours can be tolerated so long as repetitive gating with insufficient voltage does not occur. Accordingly, it will be seen that the minimum valve voltage detector 18 operates to detect an insufficient valve firing voltage condition at the instant that it occurs, and thereafter increases the $\alpha_{MIN}$ limit setting to a value to insure subsequent safe minimum valve firing voltages.

In accordance with the invention, upon detection of an insufficient valve firing voltage condition, the $\alpha_{MIN}$ setting instantaneously is increased out to some maximum value $\alpha_{MIN-MAX}$ (which for example may be 30°, 20°27° etc), and then is reduced slowly to a steady state $\alpha$ corresponding to a new $\alpha_L$ as shown in FIG. 3. This is achieved by appropriate design of the control, and is a much more desirable manner of operating from a systems standpoint than to maintain the new $\alpha_L$ at some fixed, higher $\alpha_{MIN}$ limit setting such as $\alpha_{MIN-MAX}$. To achieve this mode of operation, the error signal between the measured (actual valve voltage sample) and the reference value of valve voltage, is multiplied by a high DC gain. This is done in order instantaneously to increase the $\alpha_{MIN}$ limit setting to an adequate and safe value of valve firing voltage for the thyristor valves. If the error signal were multiplied only by unity gain (and with the sampling capacitor voltage reducing instantaneously with the firing voltage, but increasing to the new lowest value for all valves with a long time constant) the new value of $\alpha_L$ achieved may be such that the valves would fire with either (a) voltage less than $V_{REF}$ and possibly less than $V_{ABS-MIN}$ or (6) with voltage greater than $V_{REF}$, dependent upon whether the zero condition error corresponds to normal $\alpha$ at $V_{REF}$ or $\alpha_{MIN-MAX}$, respectively. Accordingly, by increasing the gain (amplifying the error signal) $\alpha_L$ will be increased to a more desirable value until for infinite gain for zero error at $\alpha_L = \alpha$ at $V_{REF}$, firing occurs at the reference value of voltage $V_{REF}$, but this would generally lead to unstable operation due to the extremely high sensitivity with infinite gain. Hence, a lesser degree of amplification is used.

Figure 4:
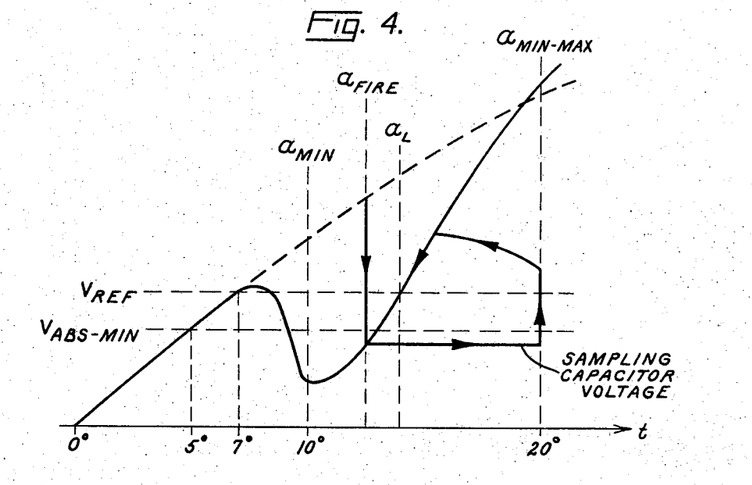
FIG. 4 is a more detailed voltage characteristic curve illustrating in greater detail the manner of operation of the new and improved control.
Figure 5:
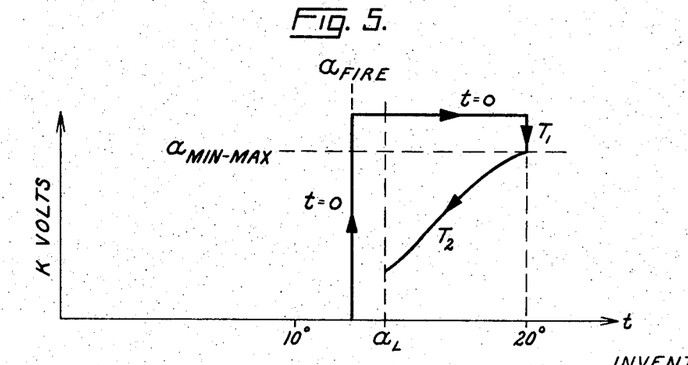
FIG. 5 is a voltage versus firing angle characteristic curve illustrating the nature of the output error control signal derived by the minimum valve voltage control.

FIGS. 4 and 5 of the drawings better depict the manner of operation of the novel minimum valve voltage control in the manner described briefly above. From consideration of FIG. 4, it will be seen that upon the occurrence of an AC system harmonic disturbance such as that depicted by the solid line waveform, the $\alpha_{MIN}$ limit setting initially will be at its normal 10° minimum value setting, and that the valve will fire and thereafter be sampled at about 12° measured with relation to the phase of the supply alternating current. At this point it will be seen that the sampling capacitor voltage will drop immediately to a value (determined by the harmonic distortion) lower than that established by $V_{REF}$ and possibly even lower than that of $V_{ABS-MIN}$. As a consequence, as shown in FIG. 5, the minimum valve voltage control circuit develops an amplified output error signal that immediately increases the $\alpha_{MIN}$ limit setting out to its maximum value $\alpha_{MIN-MAX}$ at 20°. Thereafter through operation of the control circuit, as the actual lowest value of the valve voltage sample increases to become larger than the reference value $V_{REF}$, the output voltage from the control is reduced in proportion to the error over a relatively long time constant period measured with respect to the period and repetition rate of the valve firings, back to a new $\alpha_L$ setting determined by $V_{REF}$ and the distorted waveform. It should be noted that the assumption is made that once a harmonic distortion occurs, it will not change in phase or magnitude over the period of the fault except for an initial settling period.

A suitable minimum valve voltage detector circuit for controlling the $\alpha_{MIN}$ limit circuitry of FTC 15 in the above-described fashion, is illustrated in detail in FIG. 2 of the drawings. The purpose of the minimum valve voltage detector circuit shown in FIG. 2 is to detect conditions where the voltage across a thyristor valve at the instant of firing approaches the minimum valve voltage which must be exceeded in order to insure that all parallel cells of the solid state HVDC thyristor valves turn-on. Thereafter, the detector derives an output error control signal that is used to increase the $\alpha_{MIN}$ limit setting to an increased value that is used adequate to assure a sufficient valve firing voltage across all of the thyristor valves during subsequent valve firings. This increased $\alpha_{MIN}$ limit setting then is maintained out at an increased value for a period on the order of one second to allow the AC system to recover from the transient disturbed condition which caused the insufficient valve firing voltage in the first instance.

In FIG. 2, the capacitor C1 forms the valve voltage sample storage means for storing a sample value representative of the valve voltage of each thyristor valve at the time of firing of the valve. Transistors Q4 and Q5 are connected to provide a low output impedance, voltage follower drive for capacitor C1 in the discharge direction, and transistors Q6 and Q7 provide a high impedance voltage follower load on capacitor C1 for reading out the charge on the capacitor. In addition, transistor Q6, resistor R12 and capacitor C1 are arranged to provide a large time constant charging network for charging capacitor negatively toward −15 volts over a long time constant period (on the order of one second) measured with respect to the valve firing periods and repetition rate. Charging of capacitor C1 through this network occurs with diode D59 reversed biassed.

Valve voltage samples are stored on capacitor C1 by discharging the capacitor through low impedance voltage follower drive transistors Q4 and Q5 and with diode D59 forward biassed. This drive is provided by diodes D1–D4 which are arranged in the bi-phase, full wave rectification network for rectifying the commutating voltages obtained from the secondary winding 28a of auxiliary transformer 25 for thyristor valves 3 and 6. The inverted, commutating voltage sample waveforms for these two valves as they appear at the base of driver transistor Q4, are illustrated in FIG. 6a of the drawings. Diodes D5–D8 and D9–D12 provide similar arrangements for rectifying and inverting the commutating voltages samples of thyristor valves 2 and 5 and 4 and 1, respectively.

The rectified commutating voltage samples appearing at the output of diodes D1–D12 sequentially are gated through coupling diodes D13–18 arranged in a positive logic OR gating arrangement and enabled by gating transistors Q1–Q3. The gating transistor Q1 is maintained normally off by its bias networks, and has its base electrode enabled from diodes D19–D22 arranged in a positive logic OR gate, a load resistor R16 and diodes D43 and D44 arranged in a negative OR gate. This gating arrangement is driven by distributor outputs D3 and D6'. Diodes D23–26, resistor R17 and diodes D45 and D46 are arranged in a similar manner and are driven by distributor outputs D6 and D3'. The distributor outputs D6 and D3' (nominal ½ cycle duration = 180°) are in direct antiphase with the distributor outputs D3 and D6'. With this arrangement, at the instant of firing of the thyristor valve 3, the voltage across the resistor R17 falls from approximately 13 volts to the threshold of the emitter-base voltage of gating transistor Q1, the zener voltage of zener diode Z1 and the forward voltage drops of diodes D45 and D46 as shown at FIG. 6c. As a consequence, gating transistor Q1 is turned-on causing diodes D13 and D14, which up to this point have been reversed biassed, to conduct.

Upon diodes D13 and D14 being forward biassed by turn-on of gating transistor Q1, the sample voltage for valve 3 appearing at the output of halfwave rectifying diodes D3 and D4, is applied to the base of follower drive transistor Q4 and the sample value of the lowest valve voltage appearing over a 30° sampling period will be stored on capacitor C1. During this sampling interval, diodes D43 and D44 and diodes D15–D18 will remain reversed biassed due to the 60° phase displacement of the 30° sampling pulses generated by the logical gating of the remaining distributor outputs. These are reverse biassed through diode gating arrangements similar to D23–D26, resistor R17 and diodes D45 and D46, in a manner such that at this time the voltages across the resistors R16, R18, R19, R20 and R21 are all maintained at a logical high voltages of approximately 13 volts thereby maintaining diodes D43 and D44 reversed biased and gating transistors Q2 and Q3 turned-off. All of these remaining distributor controlled, sampling circuit arrangements operate in a similar manner to sequentially sample the valve voltages of the respective thyristor valves 1–6 at the time of firing thereof during each successive cycle of operation of the power converter.

Figure 6:
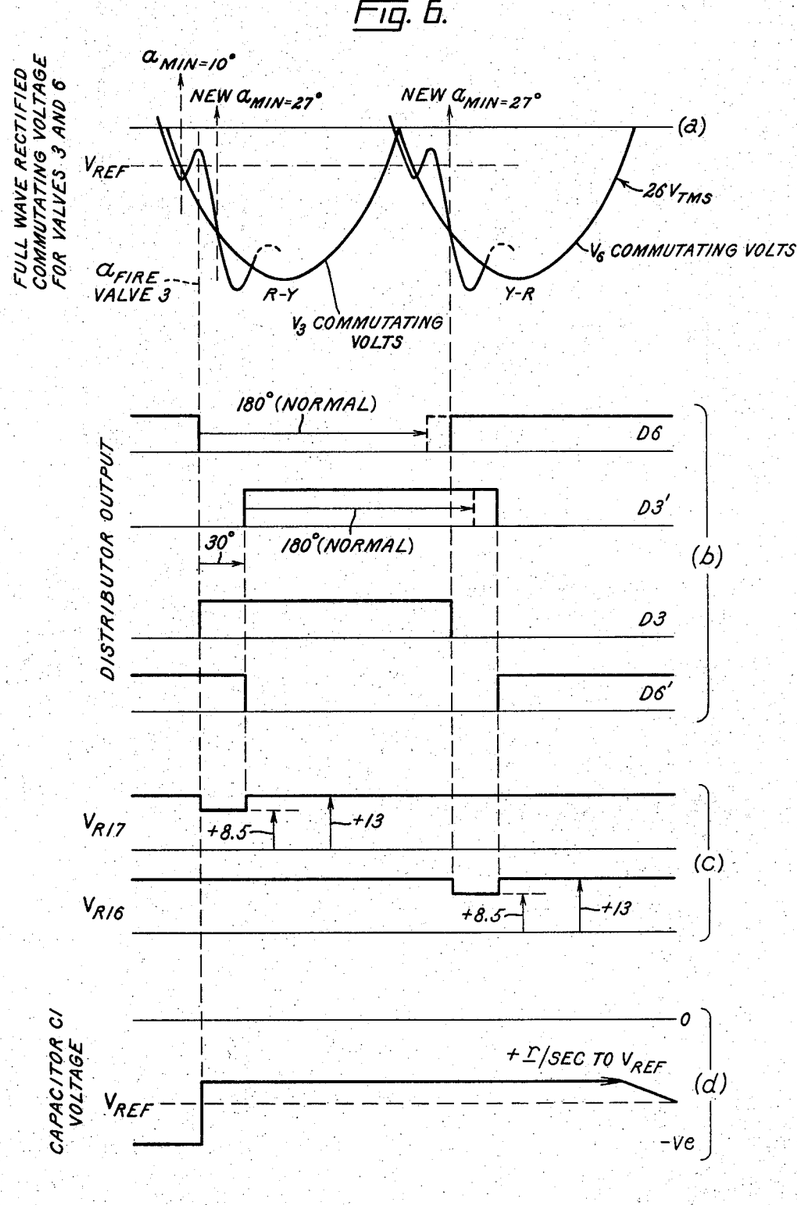
FIG. 6 is a series of voltage versus time characteristic curves illustrating the manner of operation of certain of the subcircuits comprising the overall minimum valve voltage control.

The various voltages appearing at different points in the circuit of FIG. 2, are illustrated in FIG. 6 of the drawings. In FIG. 6a, the inverter waveform of the full wave rectified commutating voltages appearing across thyristor valves 3 and 6 is shown with a supposed harmonic distortion imposed upon the normal waveform of the commutating voltages. The output gating pulses D6, D3', D3 and D6' from distributor 14 are shown in FIG. 6b. From a comparison of D6 and D3 and D3' and D6' distributor pulses it will be determined that these pulses are in direct antiphase with respect to each other. By reason of the 30° sampling interval in the spacing between the D6 and D3' distributor pulses the voltage across resistor 17 will fall from approximately a +13 voltage value shown in FIG. 6c to some intermediate value on the order of 8.5 volts causing transistor Q1 to turn-on as described above. Similarly, at the instant of firing of the thyristor valve 6, the voltage across R16 likewise will fall for a 30° sampling interval from the +13 volt normal value to the lower 8.5 volt again causing transistor Q1 to turn-on. At the time of firing of thyristor valve 3, it will be noted that due to the harmonic distortion present on the commutating voltage waveform R-Y, the commutating voltage will have fallen below the reference value established by $V_{REF}$. As a result, the negative voltage appearing across capacitor C1 immediately decreases (rises) to a value below that established by $V_{REF}$ in the manner shown in FIG. 6d.

As stated earlier, the capacitor C1 will have been charged to some negative value approaching −15 volts through the relatively long time constant charging network comprised by capacitor C1, transistor Q6 and resistor R12. Upon the commutating voltage sample for valve 3 being applied to the base of input driver transistor Q4 (by virtue of the discharge circuit comprised by transistor Q4, diode D58, transistor Q5 and diode D59) capacitor C1 rapidly will assume the lowest instantaneous value of the input commutating voltage sample over the 30° sampling interval (plus the voltage drop of diode D59) in the manner shown in FIG. 6b. If either the input commutating voltage sample magnitude exceeds this lowest instantaneous voltage, or the sampling interval is terminated by virtue of the arrival of the leading edge of the distributor output gating pulse D3', then diode D59 and the base-emitter junction of transistor Q5 become reverse biassed. This occurs since either the emitter of transistor Q4 follows an increase in magnitude of voltage, or instantaneously falls toward −15 volts as gating transistor Q1 is turned off, respectively. In either eventuality, diode D59 blocks and capacitor C1 continues to hold this lowest instantaneous commutating voltage sample value until the next valve firing at which point it will not be changed under the circumstances shown in FIG. 6a as a result of the increased commutating voltage value appearing at the sampling point.

Transistors Q6 and Q7 form a high input impedance voltage follower output for following the voltage stored on capacitor C1 without unduly loading the capacitor. Diode D60 compensates for the voltage drop across diode D59. As a consequence the emitter of transistor Q7 will be equal to the lowest instantaneous input commutating valve voltage sample that was apparent during the 30° sampling interval at the base of input transistor Q4. The emitter voltage of transistor Q7 is compared with a reference voltage value of 2.35 volts established by a resistor R14 connected to the +15 volt bus via resistor R13. This reference voltage value of 2.35 volts represents 177 percent of the absolute firing voltage $V_{ABS-MIN}$. Assuming that $V_{ABS-MIN}$ has a value of 1.5KV measured with respect to the AC system voltage, then the 2.35 volt reference level established by resistor R14 would correspond to 2.66KV on the AC system.

Under conditions where the minimum valve voltage sample from the instant of firing up to 30° later over the 30° sampling interval, is much greater than the reference voltage level $V_{REF}$ established by R14, the output of amplifier $A_1$ is approximately 15 volts. Under this condition, the diode D64 in the output of amplifier A1 will be reverse biassed, and the $\alpha_{MIN}$ limit of FTC 15 in FIG. 1 will be set (controlled) by other control regulating means in the $\alpha_{MIN}$ limit circuitry. As is best shown in FIG. 7 of the drawings, when the actual valve voltage sample on capacitor C1 at any point during the 30° sampling interval falls to within 0.5 volts of the 2.35 volt reference level established by resistor R14 (i.e., the voltage of C1 is less than −2.85 volts) the output of amplifier A1 which has a gain of 10.5 falls below a 5 volt threshold voltage level required to forward bias the diode D64 in the output of the amplifier A1, and renders the minimum valve voltage detector effective to control the $\alpha_{MIN}$ limit circuitry of FTC 15.

Figure 7:
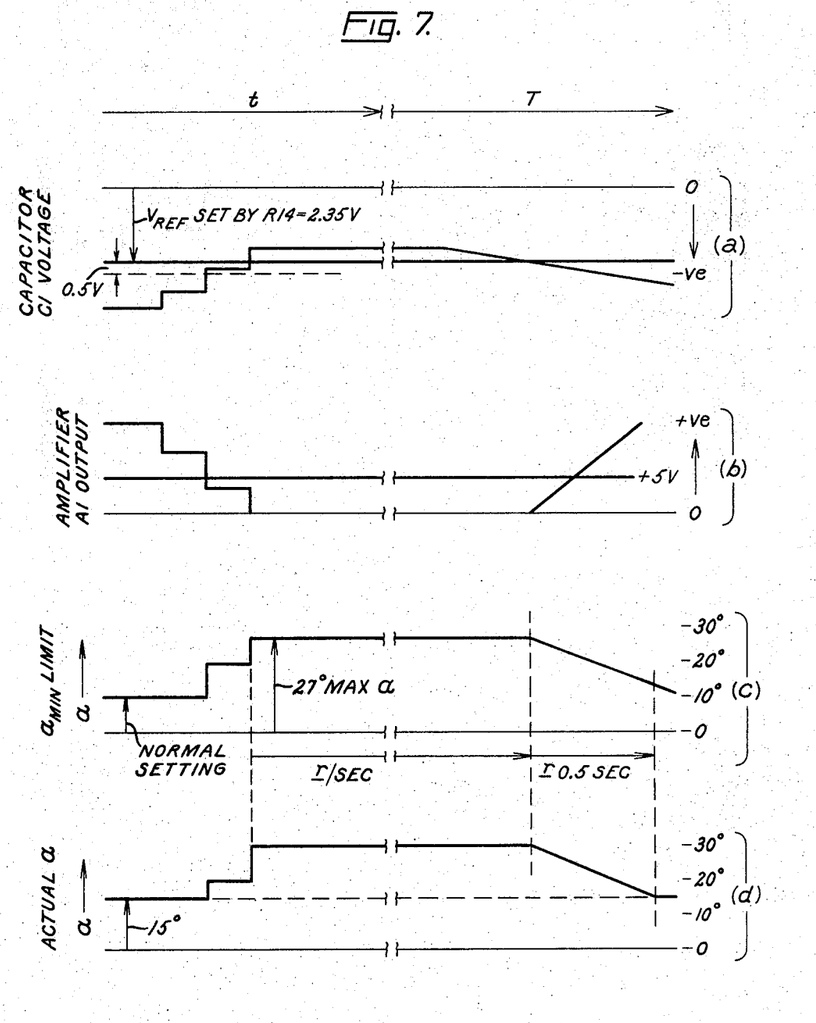
FIG. 7 is a series of voltage versus time characteristic curves illustrating the nature of the output error control signal derived by the control and its effect on the operation of the power converter.

The manner of operation of the circuit is depicted in FIG. 7 of the drawings wherein it will be noted that for decreasing thyristor valve voltage samples, the voltage appearing across the storage capacitor C1 changes in a stepped manner instantaneously with changes in the value of the sample voltage during each valve firing within a relatively short time constant period $t$. Changes in the value of the valve voltage sample in the increasing direction, however, occur over a large time constant period T, determined by the values of capacitor C1, the base emitter of transistor Q6 and resistor R12, as mentioned earlier. Assuming that initially the output of amplifier A1 is at the normal +15 volt output indicating normal operating conditions, then the minimum valve voltage control will have no effect on the $\alpha_{MIN}$ limit circuit of FTC 15 due to the fact that the threshold established by diode D64 has not been overcome. However, upon the occurrence of a distortion condition which would adversely affect the valve firing voltage such as that shown in FIG. 6a, the sampling capacitor voltage would be stepped down in value from its comparatively large negative value of 15 volts to a lesser negative value, and the output voltage of amplifier A1 steps downwardly in a corresponding manner as shown in FIGS. 7a and 7b.

At the point where the valve voltage sample stored on capacitor C1 is within approximately 0.5 volts of the reference of 2.35 volts (i.e., the voltage of C1 is less than −2.85 volts) the output of amplifier A1 falls below the 5 volt threshold level of diode D64 as shown in FIG. 7b. At this instant the output from amplifier A1 will be coupled through diode D64 to the $\alpha_{MIN}$ limit circuitry in FTC 15 and begins to raise the $\alpha_{MIN}$ limit from its nominal setting to some increased value determined by the magnitude of the error signal (i.e., the difference between capacitor C1 voltage and the 2.85 reference voltage level). Concurrently with this action a light emitting diode LED1 will be turned on and provides an inhibit signal to another portion of the firing angle control circuitry. For an output from amplifier A1 equal to 0 volts, the $\alpha_{MIN}$ limit circuitry will establish the firing angle $\alpha$ at a $\alpha_{MIN-MAX}$ setting of 27° as shown in FIG. 7c and 7d.

If on succeeding samplings the capacitor C1 stored voltage is less in magnitude than the lowest instantaneous valve voltage sample (from the instant of firing up to 30° later during the sample interval), then capacitor D1 will be charged slowing towards −15 volts over a relatively long time constant period T measured with respect to the valve firing interval and repetition rate as determined by the time constant of C1, Q6 and R12. This relatively long time constant T is adjusted such that for the condition shown in FIG. 7, the $\alpha_{MIN}$ limit will be held out to its maximum value for approximately 1 second or so before again reducing back to its nominal setting over the next half second or so.

The switch S1 connected to the output of amplifier A1 is a defeat switch which should be closed in the event that the circuit fails with a low output from amplifier A1 (i.e., $\alpha_{MIN}$ at a maximum value of 27°). Closing this defeat switch S1 can be used during servicing of the minimum valve voltage control circuit so as not to affect the overall power converter during servicing, although it should be opened immediately after the servicing has been completed.

It is to be understood that in the case of a 12 pulse bridge arrangement there will be at least one minimum valve voltage detector such as 18 for each 6 pulse bridge in the power converter. Further, where the service requirements of the power converter justify the additional expense and complexity, more than one minimum valve voltage detector circuit such as shown in FIG. 2 can be employed with additional distributors. For example in a 12 pulse bridge installation where two distributors are provided, for redundancy two minimum valve voltage detectors can be provided for each distributor. Hence, should one distributor fail, operation of the system still will be guaranteed through the other distributor and redundant minimum valve voltage detector. With such arrangements, the outputs of the redundant minimum valve voltage detectors are combined through a suitable diode OR gate arrangement and applied to the $\alpha_{MIN}$ limit circuitry in the FTC.

From the foregoing description, it will be appreciated that the invention provides a novel minimum valve voltage control method and apparatus for HVDC thyristor power converters for preventing repetitive gating of the HVDC thyristor valves under conditions where there is insufficient anode cathode voltage across the valves. As a consequence, the multi-parallel/series path HVDC solid state semiconductor thyristor valves will be protected from repetitive firings under conditions where not all the parallel paths in a given voltage level are turned on and damage to the valves will be prevented. In addition, the minimum valve voltage control assures that the valve firing spacing will remain reasonably equal even during AC system disturbances due to the fact that the control affects the firing angles of all of the valves substantially equally.

Having described one embodiment of a novel minimum valve voltage control method and apparatus constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is claimed is:

1. A minimum valve voltage firing control circuit for thyristor converters operated in the rectifying mode comprising means for sampling the value of the commutating voltage associated with the respective thyristors of a converter at the time of firing thereof, valve voltage sample storing means, gating circuit means for supplying sampled values of the respective thyristor valve voltages to said valve voltage sample storing means, means for supplying gating signals to said gating circuit means synchronously with the firing pulses supplied to the respective thyristors whereby said gating circuit means supplies sampled values of the respective thyristor valve voltages successively to the valve voltage sample storing means, comparison circuit means coupled to the valve voltage sample storing means for comparing the stored value of a thyristor valve voltage sample to a preset minimum reference value and deriving an output error signal in the event that the valve voltage sample differs from the preset minimum reference value in a predetermined manner, and means for controlling the firing angles of the respective thyristors in response to the output error signal whereby subsequent firings of the thyristors occur under conditions where the minimum valve voltage existing across the respective thyristors exceeds a value established by the preset minimum reference value.

2. A minimum valve voltage firing control circuit according to claim 1 wherein the output error signal controls the firing angles of all the thyristors of the converter simultaneously.

3. A minimum valve voltage firing control circuit according to claim 1 further including amplifying means for amplifying the output error signal severalfold to assure adequate control over the firing angles of the respective thyristors.

4. A minimum valve voltage firing control circuit according to claim 1 further comprising firing time control variable frequency oscillator means for producing properly spaced, variable frequency output firing pulses for supply to the respective thyristors of the converter to control the firing thereof and $\alpha_{MIN}$ limit control circuit means coupled to the firing time control variable frequency oscillator means for establishing a minimum angle of delay $\alpha$ with respect to the production of the firing pulses for firing the respective thyristors measured with respect to the phase of the supply alternating current waveform, and distributor means responsive to the output firing pulses from said firing time control variable frequency oscillator means for supplying firing pulses to the respective thyristors of the converter and to said gating circuit means, said output error signal being supplied to and controlling operation of said $\alpha_{MIN}$ limit control circuit means for rapidly increasing the minimum angle of delay to an increased delay angle in response to an output error signal indicative of insufficient valve voltage.

5. A minimum valve voltage firing control circuit according to claim 3 wherein the increase in the minimum angle of delay is in proportion to the magnitude of the output error signal.

6. A minimum valve voltage firing control circuit according to claim 5 further including circuit means for returning the output error signal towards zero value over a relatively long time constant period measured with respect to the period and repetition rate of the thyristor valve firings.

7. A minimum valve voltage firing control circuit according to claim 6 further including amplifying means for amplifying the output error signal severalfold in advance of supplying it to the $\alpha_{MIN}$ limit control circuit means to assure a rapid increase in the angle of delay $\alpha$ in response to the error signal.

8. A minimum valve voltage firing control circuit according to claim 7 wherein said valve voltage sample storing means comprises a capacitor, said gating circuit means comprises low impedance transistor input circuit means coupled to said capacitor for coupling sampled values of the respective thyristor valve voltages to the capacitor, and transistor switching means intercoupled with the valve voltage sampling means, the distribution means and the low impedance transistor input circuit means for transferring to said capacitor charges representative of the successive thyristor valve voltages, and further including high impedance transistor output circuit means coupled to said capacitor and to said comparison circuit means for supplying to said comparison circuit means a signal representative of the successive thyristor valve voltage values without unduly loading the capacitor.

9. A minimum valve voltage firing control circuit according to claim 8 wherein the high impedance transistor output circuit means comprises the circuit means for returning the output error signal towards zero value over a relatively long time constant period by supplying a relatively long time constant charging current to said capacitor.

10. A minimum valve voltage firing control circuit according to claim 1 wherein said valve voltage sample storing means comprises a capacitor, said gating circuit means comprises low impedance transistor input circuit means coupled to said capacitor for coupling sampled values of the respective thyristor valve voltages to the capacitor, and transistor switching means intercoupled with the valve voltage sampling means, the distributor means and the low impedance transistor input circuit means for transferring to said capacitor charges representative of the successive thyristor valve voltages, and further including high impedance transistor output circuit means coupled to said capacitor and to said comparison circuit means for supplying to said comparison circuit means a signal representative of the successive thyristor valve voltage values without unduly loading the capacitor.

11. A minimum valve voltage firing control circuit according to claim 10 wherein the output error signal controls the firing angles of all the thyristors of the converter simultaneously and further including amplifying means for amplifying the output error signal severalfold to assure adequate control over the firing angles of the respective thyristors, and circuit means for returning the output error signal towards zero value over a relatively long time constant period measured with respect to the period and repetition rate of the thyristor valve firings.

12. A method of assuring maintanence of minimum valve voltage across the thyristor valves of a power converter operated in the rectifying mode comprising sensing the value of the commutating voltage associated with each thyristor valve in the converter during a portion of its conduction interval, storing the sensed value of the respective thyristor valve voltages, comparing the stored thyristor valve voltage values to a preset minimum reference value and deriving an output error signal indicative of any difference, and applying output error signals indicative of insufficient valve voltages to control the firing angle of delay $\alpha$ of the thyristor valves in the further operation of the power converter whereby the firing angle of delay $\alpha$ of the thyristors is increased to assure sufficient valve firing voltage across the thyristor valves in the presence of AC system disturbances.

13. A method according to claim 12 further including automatically returning the firing angle of delay $\alpha$ of the thyristor back to a normal setting determined by other control parameters of the converter over a relatively long time constant period measured with respect to the period and repetition rate of the thyristor valve firings.

14. A method according to claim 13 wherein the firing angle of delay $\alpha$ of all the thyristor valves of the power converter are controlled simultaneously.

15. A method according to claim 14 wherein the output error signal is amplified severalfold in advance of applying it to increase the firing angle of delay $\alpha$ of the thyristor valves of the converter whereby a sudden and rapid increase in the firing angle of delay $\alpha$ is achieved in order to accommodate AC system transient disturbances that otherwise might result in an insufficient valve voltage across the thyristor valves at the time of firing.

16. A minimum valve voltage firing control circuit for thyristor converters operated in the rectifying mode comprising means for sampling the value of the commutating voltage associated with each respective thyristor of a converter at the time of firing thereof, means for comparing the value of the minimum thyristor valve voltage samples to a preset minimum reference value and deriving an output error signal in the event that a valve voltage sample differs from the preset minimum reference value in a predetermined manner, and means for increasing the firing angle of delay of the respective thyristors in response to the output error signal whereby subsequent firings of the thyristors occur under conditions where the minimum valve voltage existing across the respective thyristors exceeds a value established by the preset minimum reference value.

17. A minimum valve voltage firing control circuit according to claim 16 wherein the output error signal controls the firing angles of all the thyristors of the converter simultaneously and the circuit further includes means for returning the output error signal toward zero value over a relatively long time constant period measured with respect to the period and repetition rate of the thyristor valve firings.

18. A minimum valve voltage firing control circuit according to claim 16 wherein the value of the commutating voltage associated with the respective thyristor is sampled continuously over a predetermined sampling interval of the order of 30° and the minimum valve voltage occurring during the interval compared to the preset minimum reference value.

* * * * *